United States Patent [19]

Kaminow et al.

[11] 4,179,189

[45] Dec. 18, 1979

[54] SINGLE POLARIZATION OPTICAL FIBERS AND METHODS OF FABRICATION

[75] Inventors: Ivan P. Kaminow, Tinton Falls; Vellayan Ramaswamy, Lincroft, both of N.J.

[73] Assignee: Bell Telephone Laboratories, Incorporated, Murray Hill, N.J.

[21] Appl. No.: 869,366

[22] Filed: Jan. 13, 1978

[51] Int. Cl.$^2$ .............................................. G02B 5/14
[52] U.S. Cl. .................................. 350/96.33; 65/3 A; 350/96.12; 350/96.30; 350/149
[58] Field of Search ............... 350/96.12, 96.29, 96.30, 350/96.33, 149; 65/3 R, 3 A

[56] References Cited

U.S. PATENT DOCUMENTS

| 3,659,916 | 5/1972 | Marcatili | 350/96.12 |
| 3,980,459 | 9/1976 | Li | 350/96.30 X |
| 3,982,916 | 9/1976 | Miller | 350/96.30 X |
| 4,070,091 | 1/1978 | Taylor et al. | 350/96.33 |
| 4,106,847 | 8/1978 | Arnaud | 350/96.30 X |

FOREIGN PATENT DOCUMENTS 7510685  3/1976  Netherlands .......................... 350/96.30

OTHER PUBLICATIONS

Kapron et al., "Birefringence in Dielectric Optical Waveguides", *IEEE Journal of Quant. Elect.*, vol. QE-8, No. 2, Feb. 1972, pp. 222-225.

*Primary Examiner*—John K. Corbin
*Assistant Examiner*—John D. Lee
*Attorney, Agent, or Firm*—Sylvan Sherman

[57] ABSTRACT

Orthogonally polarized waves are more effectively decoupled in a waveguide that is fabricated in a manner so as to deliberately enhance stress-induced birefringence. This characteristic is accomplished by introducing a geometrical and material asymmetry in the preform from which the optical fiber is drawn. Three methods of preparing the preform are disclosed. Optical waveguides capable of transmitting power with only one direction of polarization are desirable for use with integrated optical devices which are polarization sensitive.

7 Claims, 9 Drawing Figures

SINGLE POLARIZATION OPTICAL FIBERS AND METHODS OF FABRICATION

TECHNICAL FIELD

This invention relates to optical waveguides supportive of wave propagation with only one direction of polarization.

BACKGROUND ART

Optical waveguides capable of transmitting power with only one direction of polarization are desirable for use with integrated optical devices. However, it is well known that geometric or dielectric imperfections in conventional graded-index fibers depolarize light after only a few centimeters of propagation. While some slight improvment in the polarization performance of these fibers is achieved by distorting the fiber core symmetry as a means of decoupling the differently polarized waves, and analysis, based on an article by E. A. J. Marcatili entitled "Dielectric Rectangular Waveguide and Directional Coupler For Integrated Optics" published in the September 1969 issue of the *Bell System Technical Journal*, pp. 2071–2102, shows that simply changing the core geometry does not appreciably alter the difference in the propagation constants of the two orthogonally-polarazied fundamental modes.

An alternative approach to this problem is disclosed in U.S. Pat. No. 3,659,916 which discloses a fundamental mode strip waveguide in which a lossy material is placed along one surface of the guiding strip to suppress one of the two orthogonally polarized modes. Alternatively, a higher refractive index material can be used instead of a lossy material as a means of destroying the waveguide's ability to guide one of the modes. While these techniques serve to suppress one of the two modes by absorption or radiation, they do not preclude coupling between the modes. As a result, there is a constant draining of power from the preferred polarization to the undesired polarization, and consequent loss. Thus, single polarization waveguides of the type described tend to be unduly lossy.

In a copending application by Pleibel and Stolen, Ser. No. 869,365, filed concurrently with this application on Jan. 13, 1978, an improved single polarization fiber is disclosed comprising an outer layer having a circular outer surface and an elliptical inner surface; an inner elliptical core region; and an intermediate cladding layer that conforms to the core and substrate surface configurations. While it was initially believed that the improved polarization-preserving characteristics were due to the geometrically asymmetric configuration, it has been shown that stress-induced birefringence is, in fact, the dominant factor in the improved polarization performance of this particular fiber structure. While stress-induced birefringence, of a magnitude on the order of $10^{-7}$, has been measured in conventionally drawn optical fibers (see "Birefringence in Dielectric Optical Waveguides," by F. P. Kapron et al., published in the *IEEE Journal of Quantum Electronics*, Vol. QE-8, No. 2, February 1972, pp. 222–225), the size of the effect is insufficient to reduce polarization coupling to a practically useful level. Furthermore, stress-induced birefringence was not recognized as a possible means for reducing such coupling.

SUMMARY OF THE INVENTION

The present invention is based upon the recognition that orthogonally polarized waves are more efficiently decoupled in a waveguide that is fabricated in a manner so as to deliberately enhance stress-induced, or strain birefringence. This behavior is accomplished by introducing a geometrical and material asymmetry in the preform from which the optical fiber is drawn such that the resulting strain birefringence $\Delta n$ is advantageously greater that $5 \times 10^{-5}$. The resulting beat period, L, for such a waveguide is less than 20 mm at 1 $\mu$m wavelength and less than 10 mm at 0.5 $\mu$m, where $L = 2\pi/\Delta\beta$, and $\Delta\beta$ is the difference in propagation constants for the two orthogonal directions of wave polarization of interest.

Methods for fabricating fibers with $\Delta n$ as large as $40 \times 10^{-5}$ are described. In this case L is 2.5 mm at 1 $\mu$m wavelength, and 1.25 mm at 0.5 $\mu$m.

DETAILED DESCRIPTION

Figure 1:
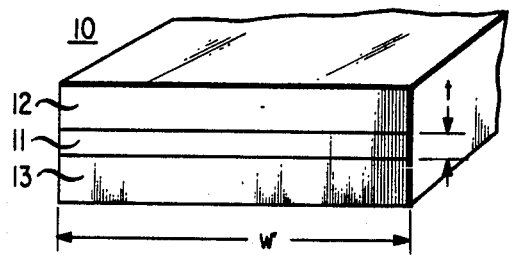
FIGS. 1 and 2 show two types of planar optical waveguides.

Referring to the drawings, FIG. 1 shows a planar waveguide 10 comprising an inner dielectric member 11 and two outer dielectric layers 12 and 13 which are in contact with the major surfaces of member 11. In order to provide wave guidance primarily within the inner dielectric member 11, or core region of this waveguide, the refractive index of the outer layers is less than that of member 11.

Notwithstanding the fact that the width w of the core is many times greater than its thickness t, such a waveguide is capable of propagating optical wave energy polarized along directions parallel to both transverse dimensions of the core region. In the absence of any extraneous coupling mechanism, a beat length, L, can be defined within which energy is completely exchanged between the two orthogonally polarized waves, i.e., the energy reappears in the same polarization after completely being transferred to the other polarization. For a single-mode fiber this length, L, is given as $$L = 2\pi/\Delta\beta, \tag{1}$$

where $\Delta\beta$ is the difference in the propagation constants of the two orthogonally polarized waves. It is apparent that by increasing $\Delta\beta$, the beat length can be reduced. Since mechanical perturbations having spatial periods that are comparable to the beat length cause unwanted coupling from one polarization to another, the beat period is advantageously made smaller than the perturbation periods typically introduced by the fabrication process, or by physical bends and twists encountered in the use of the waveguide. For example, at a wavelength of 0.63 μm a borosilicate, graded-index fiber with nominally circular geometry has an L greater than 10 cm. Mechanical perturbations of comparable length are not unusual. Accordingly, wave energy injected with one polarization and propagating along such a fiber tends to become cross-polarized. Similarly, prior art planar fibers of the type shown in FIG. 1 also tend to yield cross-polarized wave energy notwithstanding the fact that the aspect ratio of the waveguiding region is much different than unity. The polarization coupling, however, is avoided in accordance with the present invention by means of stress-induced birefringence in the waveguide which greatly increases $\Delta\beta$. The term "stress-induced birefringence" or "strain birefringence" as used herein refers to the difference in principal refractive indices produced by the creation of a difference in the mechanical stresses along mutually orthogonal transverse directions within the waveguide region. Thus, for example, a birefringence can be induced in dielectric layer 11 if the thermal coefficient of expansion of layer 11 is different than that of the outer layers 12 and 13. When this is so, the width of member 11 will want to be different than that of layers 12 and 13 as the fiber cools while being drawn. However, because the three layers are bonded together they will all assume the same width, thereby, creating an internal strain within member 11 along the w direction when the outer layers are sufficiently rigid. However, as no such strain is induced in the t direction, the result of this anisotropic strain is to create a relatively large difference in the propagation constants for wave energy polarized along these two directions by means of the photoelectric effect.

The magnitude of the difference in the refractive indices Δn for the two directions of polarization is proportional to the difference in the strains along these two directions, and is given by $$\Delta n \sim (\alpha_o - \alpha_i) \Delta T \qquad (2)$$

where $\alpha_o$ and $\alpha_i$ are the coefficients of thermal expansion of the outer and inner layers, respectively; and $\Delta T$ is the difference between the operating temperature and the temperature at which the glass layers stiffen.

Figure 2:
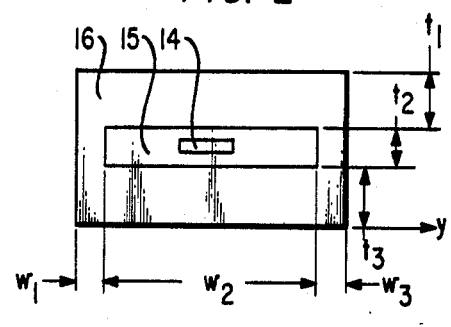

In order to provide lateral wave guidance, the slab structure of FIG. 1 can be modified, as shown in FIG. 2, so as to comprise an inner core region 14, surrounded by an intermediate cladding 15 of lower refractive index, and an outer jacket 16. Such a preform structure can be readily fabricated by assembling separate slabs of glass, or by successive deposition methods well known in the art. Alternate methods for approximating such a preform are described in greater detail hereinbelow.

To achieve the desired large birefringence in the waveguiding portion, comprisng core 14 and cladding 15, the difference between the thermal coefficients of expansion of the jacket material and the waveguide material is made large. In addition, the slab dimensions advantageously satisfy the following inequalities:

$$(t_1 + t_3)c_1 \gg t_2 c_2 \qquad (3)$$

and $$(w_1 + w_3)c_1 \gg w_2 c_2, \qquad (4)$$

where $c_1$ and $c_2$ are the elastic moduli of the jacket and waveguide materials, respectively. Typically, $c_1$ and $c_2$ will be approximately the same so that the above inequalities are primarily geometrical. In some cases, as will be shown below, $w_1$ and $w_3$ are zero.

The differential strain induced in the embodiment of FIG. 2 is $$(S_y - S_x) = (\alpha_1 - \alpha_2)\Delta T \qquad (5)$$

where $S_y$ and $S_x$ are the strains induced along the y and x directions, respectively; and $\Delta T = T_a - T_b$, where $T_a$ is the operating ambient temperature, and $T_b$ is approximately equal to the "softening temperature" of the material, and $\alpha_1$ and $\alpha_2$ are the thermal expansion coefficients of the jacket and waveguide regions, respectively. For simplicity, $\alpha_1$ and $\alpha_2$ are assumed to be independent of temperature when making estimates.

The strain birefringence Δn is given by $$\Delta n = (n^{3/2})(p_{11} - p_{12})(\alpha_1 - \alpha_2)\Delta T, \qquad (6)$$

where n is the refractive index and $p_{11}$ and $p_{12}$ are the photoelastic constants of the waveguide material.

Typically, a preform will comprise a pure silica jacket, and a cladding and core made of borosilicate, germanosilicate or phosphosilicate glasses, where the core and cladding are differentially doped to obtain the desired index difference. For illustrative purposes, the silica values for $p_{11}$ and $p_{12}$ are used in the following examples.

EXAMPLE 1

For a 5 mole percent $B_2O_3-SiO_2$ cladding, the calculated Δn is $1 \times 10^{-4}$, where $n \approx 1.5$, $(p_{11}-p_{12}) \approx 0.15$, $(\alpha_1-\alpha_2) \approx -5 \times 10^{-7}$ degrees $C^{-1}$ and $\Delta T \approx -850$ degrees C.

EXAMPLE 2

For a 25 mole percent $G_eO_2-SiO_2$ cladding, the calculated Δn is $4 \times 10^{-4}$, where $n \approx 1.5$, $(p_{11}-p_{12}) \approx 0.15$, $(\Delta_1-\alpha_2) = -1.6 \times 10^{-6}$ degrees $C^{-1}$ and $\Delta T \approx -1000$ degrees C.

EXAMPLE 3

For a 12 mole percent $P_2O_5-SiO_2$ cladding, the calculated Δn is $4 \times 10^{-4}$, where $n \approx 1.5$, $(p_{11}-p_{12}) \approx 0.15$, $(\alpha_1-\alpha_2) = 1.4 \times 10^{-6}$ degrees $C^{-1}$ and $\Delta T \approx -1200$ degrees C.

In each of the preceding examples, the core and cladding are assumed to have approximately the same thermal properties.

Figure 3:
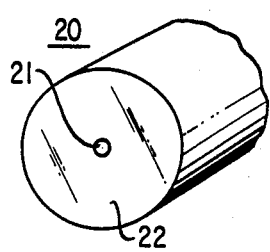
FIG. 3 shows a standard circular optical fiber preform comprising an inner core surrounded by a cladding.
Figure 4:
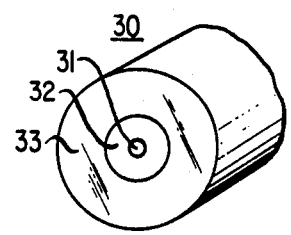
FIG. 4 shows a three-layered, optical fiber preform.
Figure 5:
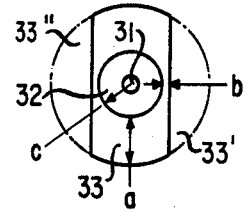
FIG. 5 shows the preform of FIG. 4 after diametrically oppostie portions of the outer layer have been removed.
Figure 6:
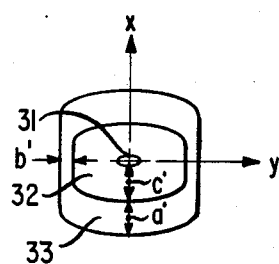
FIG. 6 shows the cross-section of a fiber pulled from the modified preform of FIG. 5.

Having recognized the operative mechanism, the principles of the present invention can be applied to adapt conventional optical fibers as well. Typically, an optical fiber is drawn from a preform 20 of the type illustrated in FIG. 3 comprising an inner core region 21 surrounded by an outer cladding 22. Because of its circular symmetry, there tends to be very little stress-induced birefringence in a fiber drawn from such a preform. Accordingly, an asymmetry must be deliberately introduced to enhance the strain birefringence. More specifically, consider as the starting preform a three-layered structure 30 of the type shown in FIG. 4, comprising an inner core region 31, surrounded by an intermediate cladding layer 32, and an outer jacket layer 33. In accordance with the invention, diametrically oppostie portions of the outer layer 33 are ground away, or otherwise removed, leaving the preform as shown in FIG. 5 comprising core 31, cladding 32, and a modified outer layer 33 from which portions 33' and 33" have been removed. When such a modified preform is drawn, surface tension alters its cross-section to that shown in FIG. 6 which, it will be noted, approximates the slab configuration of FIG. 2. As in the embodiment of FIG. 2, the outer jacket layer 33 produces a strain within the fiber along the y-direction that is much greater than that produced along the x-direction. The ratio of the two strains is related to the thicknesses a, b, and c in the preform, and corresponding dimensions a', b' and c' in the resulting fiber.

While any asymmetry will produce a strain birefringence, it has been found that beat periods of less than 5 mm are achieved when the ratio of cladding radius c to the original thickness a is less than one-half, that is $$c/a < 0.5, \quad (7)$$

and when the ratio of the reduced thickness b of the outer layer to the original thickness a is equal to or less than one-tenth, that is $$b/a < 0.1. \quad (8)$$

Figure 7:
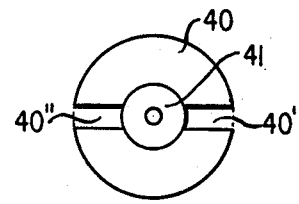
FIGS. 7 and 8 show, respectively, an alternate means of modifying a three-layered preform to enhance the strain-birefringence, and the cross-section of a fiber pulled from such a preform.
Figure 8:
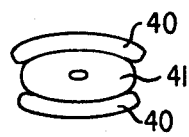

FIG. 7 shows an alternate means of introducing an asymmetry in the outer layer of a preform. In accordance with this method, diametrically opposed slots 40' and 40" are cut in the outer layer 40 surrounding the cladding 41. A fiber drawn from such a preform took on the form shown in FIG. 8.

Figure 9:
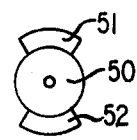
FIG. 9 illustrates a method of modifying a two-layered preform to produce stress-induced birefringence in an optical fiber.

In accordance with a third method of fabrication, illustrated in FIG. 9, diametrically opposed, annular segments 51 and 52 are added to cladding layer 50 of the fiber preform.

Which of these techniques is employed will depend upon the nature of the starting preform. Some, such as borosilicate doped preforms, are typically made with three layers. Hence, the methods illustrated in FIGS. 5 and 7 would be used. On the other hand, when starting with a two layered preform, the method of FIG. 9 can be used.

What is claimed is:

1. A single polarization optical waveguide at least partially surrounded by an outer jacket having a different thermal expansion coefficient than said waveguide, and a thickness a along one direction that is different than its thickness b along a direction orthogonal to said one direction;
characterized in that:
the ratio of b to a is equal to or less than 0.1; and in that the induced strain birefringence $\Delta n$ of the waveguide is greater than $5 \times 10^{-5}$.

2. A method of preparing a preform comprising an inner core surrounded by a cladding, for the fabrication of an optical fiber having enhanced strain birefringence of greater than $5 \times 10^{-5}$, characterized by the step of forming along diametrically opposed regions of said preform first portions of an outer jacket having a thickness that is greater than the cladding radius, and second portions of said jacket, located along said preform between said first portions, having a thickness that is less than the cladding radius.

3. The method according to claim 2 wherein the ratio of the thickness of said jacket between said regions to the thickness of said jacket within said regions is less than 0.1.

4. The method according to claim 2 wherein said preform initially includes a uniformly thick outer jacket and wherein said step includes forming two, diametrically opposed longitudinally extending slots along said jacket.

5. The method according to claim 2 wherein said preform initially includes an outer jacket of uniform thickness a, and wherein said step includes removing diametrically opposed portions of said jacket so as to leave a jacket thickness b, where $b/a \leq 0.1$.

6. The method according to claim 2 wherein said preform initially includes a core region surrounded by a cladding, and wherein said step includes adding two annular sections of outer jacket along diametrically opposed portions of said preform.

7. The method according to claim 2 including the further step of drawing a fiber from said preform.

* * * * *

UNITED STATES PATENT AND TRADEMARK OFFICE
CERTIFICATE OF CORRECTION

PATENT NO. : 4,179,189
DATED : December 18, 1979
INVENTOR(S) : Ivan P. Kaminow and Vellayan Ramaswamy It is certified that error appears in the above-identified patent and that said Letters Patent are hereby corrected as shown below:

Column 1, line 21, "and" should read --an--; line 54, "configuation" should read --configuration--. Column 4, line 1, ">>" should read --<<--; line 45, "$\Delta_1$" should read --$\alpha_1$--.

Signed and Sealed this

Seventeenth Day of June 1980

[SEAL]

Attest:

SIDNEY A. DIAMOND

Attesting Officer

Commissioner of Patents and Trademarks